US010053784B2

(12) United States Patent
Daimon et al.

(10) Patent No.: US 10,053,784 B2
(45) Date of Patent: Aug. 21, 2018

(54) DIFFERENTIAL PRESSURE WATER ELECTROLYSIS SYSTEM (71) Applicant: HONDA MOTOR CO., LTD., Tokyo (JP)

(72) Inventors: Hayato Daimon, Wako (JP); Eiji Haryu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 388 days.

(21) Appl. No.: 14/931,745

(22) Filed: Nov. 3, 2015

(65) Prior Publication Data
US 2016/0130708 A1   May 12, 2016

(30) Foreign Application Priority Data

Nov. 6, 2014 (JP) .................................. 2014-225948

(51) Int. Cl.
| C25B 9/10 | (2006.01) |
| C25B 3/00 | (2006.01) |
| C25B 9/04 | (2006.01) |
| C25B 1/12 | (2006.01) |
| C25B 1/06 | (2006.01) |
| C25B 9/18 | (2006.01) |
| C25B 9/00 | (2006.01) |
| C25B 9/08 | (2006.01) |

(52) U.S. Cl.
CPC .................. C25B 1/12 (2013.01); C25B 1/06 (2013.01); C25B 9/00 (2013.01); C25B 9/08 (2013.01); C25B 9/18 (2013.01); Y02E 60/366 (2013.01)

(58) Field of Classification Search
CPC .. C25B 9/10; C25B 11/00; C25B 3/00; C25B 9/04
USPC .......................................................... 204/255
See application file for complete search history.

(56) References Cited

U.S. PATENT DOCUMENTS

| 5,421,977 A * | 6/1995 | Getsy ........................ C25B 9/20 204/252 |
| 2013/0001070 A1* | 1/2013 | Stemp ..................... C25B 15/08 204/256 |

FOREIGN PATENT DOCUMENTS

| JP | 2010189708 | * 9/2010 | ............... C25B 9/04 |
| JP | 2011-127209 | 6/2011 | |

* cited by examiner

Primary Examiner — Zulmariam Mendez
(74) Attorney, Agent, or Firm — Mori & Ward, LLP (57) ABSTRACT A differential pressure water electrolysis system includes high-pressure water electrolysis cells and a high pressure hydrogen manifold. The high-pressure water electrolysis cells are stacked in a stacking direction. Each of the high-pressure water electrolysis cells includes an electrolyte membrane, an anode current collector, a cathode current collector, a tabular anode separator, a tabular cathode separator, a sealing member, and a resin frame member. The resin frame member is disposed between the tabular anode separator and the tabular cathode separator so as to surround the sealing member and the anode current collector. The resin frame member includes a water supply port to introduce water for electrolysis and a water discharge port to discharge a surplus of the water after electrolysis. The high pressure hydrogen manifold is provided so as to distribute hydrogen in the stacking direction and so as to be encircled by the sealing member.

13 Claims, 7 Drawing Sheets

DIFFERENTIAL PRESSURE WATER ELECTROLYSIS SYSTEM

CROSS-REFERENCE TO RELATED APPLICATIONS

The present application claims priority under 35 U.S.C. § 119 to Japanese Patent Application No. 2014-225948, filed Nov. 6, 2014, entitled "Differential Pressure Water Electrolysis System." The contents of this application are incorporated herein by reference in their entirety.

BACKGROUND

1. Field

The present disclosure relates to a differential pressure water electrolysis system.

2. Description of the Related Art

Typically, hydrogen gas is used as a fuel gas used to perform a power generation reaction in a fuel cell. The above hydrogen is produced by a water electrolyzer, for example. The water electrolyzer uses a solid polymer electrolyte membrane (an ion-exchange membrane) for generating hydrogen (and oxygen) through electrolysis of water.

An electrode catalyst layer is provided on both surfaces of the solid polymer electrolyte membrane such that an electrolyte membrane-electrode structure is configured, and a current collector is disposed on both sides of the electrolyte membrane-electrode structure such that a water electrolysis cell is configured.

In a water electrolyzer in which a plurality of water electrolysis cells are stacked, voltage is applied to both ends in a stacking direction and water is supplied to an anode current collector. Accordingly, water is electrolyzed and hydrogen ions (protons) are generated on the anode side of the electrolyte membrane-electrode structure, the hydrogen ions permeate the solid polymer electrolyte membrane and is transferred to the cathode side, and the hydrogen ions are combined with the electrons in a cathode current collector such that hydrogen is produced. Meanwhile, on the anode side, oxygen that has been generated together with hydrogen is discharged from the water electrolyzer together with surplus water.

As the water electrolyzer, a differential pressure water electrolysis system that, while producing oxygen on the anode side, produces, on the cathode side, hydrogen that has a higher pressure with respect to the pressure of the oxygen by electrolyzing water is employed. Specifically, current collectors are provided on both sides of the solid polymer electrolyte membrane and separators are stacked on the current collectors and, further, a water flow passage that supplies water is formed between one of the current collectors and one of the separators. Furthermore, a hydrogen flow passage that obtains hydrogen generated through electrolysis of water and that has a high-pressure that is higher than the normal pressure is formed between the other current collector and the other separator.

For example, the water electrolyzer disclosed in Japanese Unexamined Patent Application Publication No. 2011-127209 includes a unit cell in which an anode side separator and a cathode side separator holds an electrolyte membrane-electrode structure in between. The water electrolyzer includes a plurality of unit cells stacked on each other. In the water electrolyzer, a water inlet manifold for supplying water for electrolysis to the water flow passages of the unit cells extend in the stacking direction and a water outlet manifold for discharging the water after electrolysis from the water flow passages extend in the stacking direction.

Accordingly, a plurality of inlet connection flow passages that communicate the water inlet manifold and the water flow passage, and a plurality of outlet connection flow passage that communicate with the discharge manifold are provided in each anode side separator.

SUMMARY

According to one aspect of the present invention, a differential pressure water electrolysis system includes an electrolyte membrane, an anode current collector, a cathode current collector, a tabular anode separator, a tabular cathode separator, a sealing member, a high-pressure water electrolysis cell, and a plurality of the high-pressure water electrolysis cells. The anode current collector and the cathode current collector hold the electrolyte membrane in between. The tabular anode separator includes an anode chamber in which the anode current collector is accommodated. The tabular cathode separator includes a cathode chamber in which the cathode current collector is accommodated. The sealing member is disposed in the cathode chamber so as to encircle the cathode current collector. The high-pressure water electrolysis cell electrolyzes water that has been supplied. The high-pressure water electrolysis cell generates oxygen on an anode current collector side and generates hydrogen, on a cathode current collector side, that has a pressure that is higher than a pressure of the oxygen. The plurality of the high-pressure water electrolysis cells are stacked. A high pressure hydrogen manifold that distributes the hydrogen, having a high pressure, in the stacking direction of the high-pressure water electrolysis cell is provided so as to be encircled by the sealing member. A resin frame member is disposed between the tabular anode separator and the tabular cathode separator so as to surround the sealing member and the anode current collector. A water supply port that introduces water for electrolysis and a water discharge port that discharges a surplus of the water after electrolysis are formed in the resin frame member.

According to another aspect of the present invention, a differential pressure water electrolysis system includes high-pressure water electrolysis cells and a high pressure hydrogen manifold. The high-pressure water electrolysis cells are stacked in a stacking direction. Each of the high-pressure water electrolysis cells includes an electrolyte membrane, an anode current collector, a cathode current collector, a tabular anode separator, a tabular cathode separator, a sealing member, and a resin frame member. The anode current collector and the cathode current collector hold the electrolyte membrane between the anode current collector and the cathode current collector. The tabular anode separator defines an anode chamber in which the anode current collector is accommodated. The tabular cathode separator defines a cathode chamber in which the cathode current collector is accommodated. The sealing member is disposed in the cathode chamber so as to encircle the cathode current collector. The resin frame member is disposed between the tabular anode separator and the tabular cathode separator so as to surround the sealing member and the anode current collector. The resin frame member includes a water supply port to introduce water for electrolysis and a water discharge port to discharge a surplus of the water after electrolysis. Each of the high-pressure water electrolysis cells is to electrolyze the water that has been supplied to each of the high-pressure water electrolysis cells to generate oxygen on an anode current collector side and generate hydrogen having a pressure higher than a pressure of the oxygen on a cathode current collector side. The high pressure hydrogen manifold is provided so as to distribute the hydrogen in the stacking direction and so as to be encircled by the sealing member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
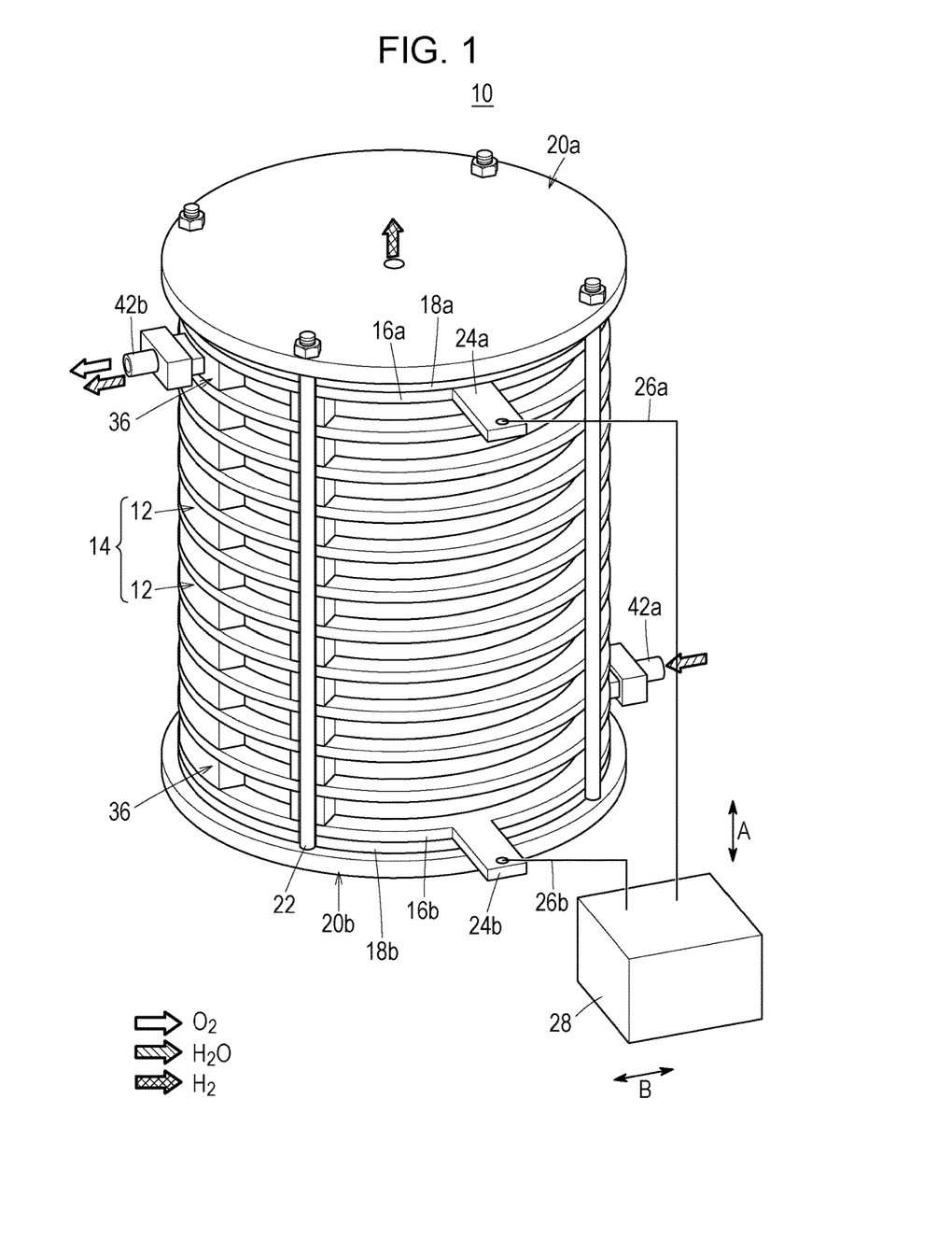
FIG. 1 is a perspective view for describing a differential pressure water electrolysis system according to an exemplary embodiment of the present disclosure.

As illustrated in FIG. 1, a differential pressure water electrolysis system 10 according to an exemplary embodiment of the present disclosure includes a fuel cell stack 14 in which a plurality of high-pressure water electrolysis cells 12 are stacked in the vertical direction (an arrow A direction) or in the horizontal direction (an arrow B direction).

A terminal plate 16a, an insulation plate 18a, and an end plate 20a are sequentially disposed upwards at one end (an upper end) of the fuel cell stack 14 in a stacking direction. A terminal plate 16b, an insulation plate 18b, and an end plate 20b are sequentially disposed downwards at the other end (a lower end) of the fuel cell stack 14 in the stacking direction.

The differential pressure water electrolysis system 10 is fastened in the stacking direction by having a portion between the disc shaped end plates 20a and 20b be fastened and held in an integrated manner with a pressing mechanism, namely, four tie rods 22 that extend in the arrow A direction, for example. Note that the differential pressure water electrolysis system 10 may employ a configuration in which the differential pressure water electrolysis system 10 is held in an integrated manner with a box-shaped casing (not shown) including the end plates 20a and 20b serving as the end plates. Furthermore, the overall differential pressure water electrolysis system 10 having a substantially columnar shape may be configured to have various shapes such as a rectangular parallelepiped shape.

Terminals 24a and 24b that protrude outwards are provided in the side portions of the terminal plates 16a and 16b.

The terminals 24a and 24b are electrically connected to an electrolysis power source 28 through wires 26a and 26b, respectively.

Figure 2:
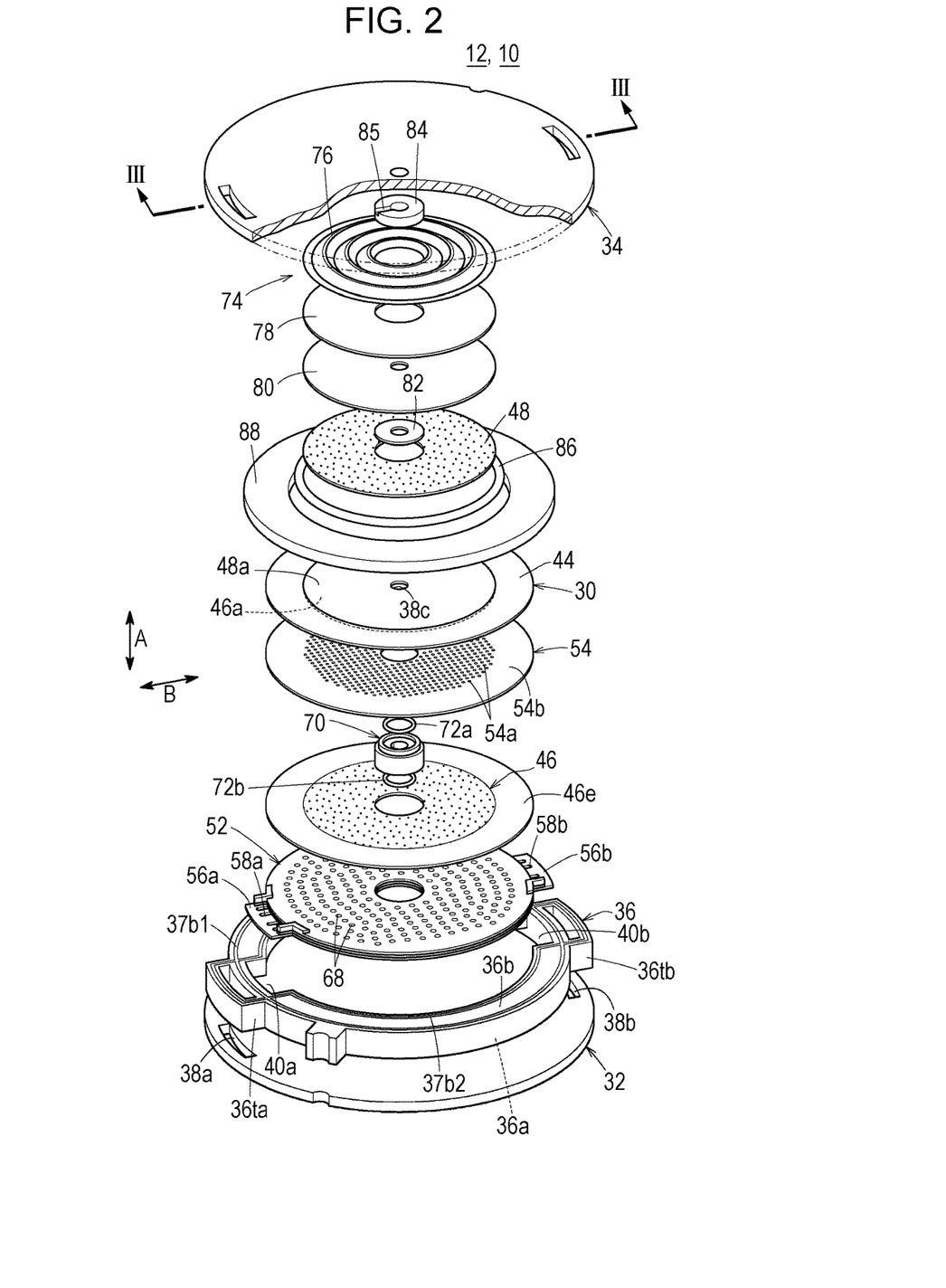
FIG. 2 is an exploded perspective view for describing a high-pressure water electrolysis cell included in the differential pressure water electrolysis system.
Figure 3:
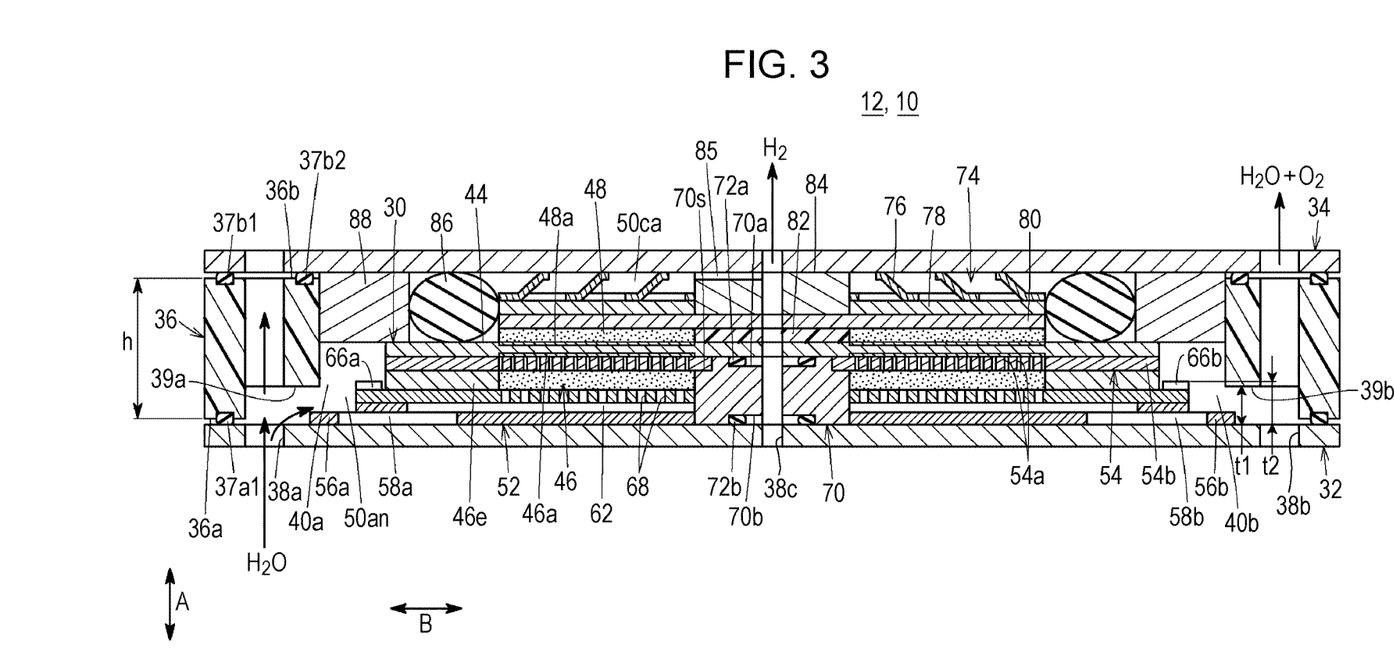
FIG. 3 is a cross sectional view of the high-pressure water electrolysis cell taken along line III-III in FIG. 2.

As illustrated in FIGS. 2 and 3, each high-pressure water electrolysis cell 12 includes a substantially discoidal electrolyte membrane-electrode structure 30, and a tabular anode separator 32 and a tabular cathode separator 34 that hold the electrolyte membrane-electrode structure 30 therebetween. A resin frame member 36 is disposed between the anode separator 32 and the cathode separator 34 so as to surround the electrolyte membrane-electrode structure 30 and sealing members described later.

Figure 4:
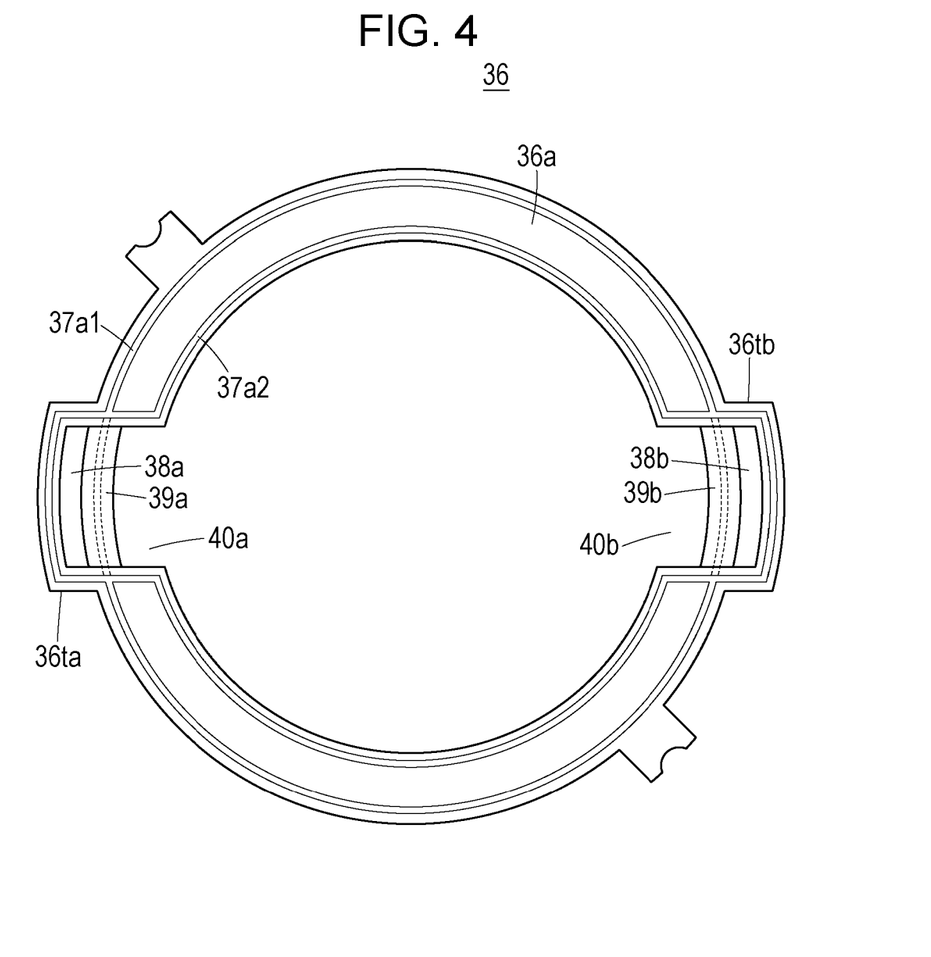
FIG. 4 is a plan view of a resin frame member included in the high-pressure water electrolysis cell viewed from the bottom side.

The resin frame member 36 has a substantially ring-shape (doughnut-shape) and has a predetermined wall thickness h. As illustrated in FIGS. 3 and 4, first sealing members 37a1 and 37a2 are provided on a surface 36a oriented towards the anode separator 32 of the resin frame member 36. While the first sealing member 37a1 encircles an outer peripheral edge portion of the resin frame member 36, the first sealing member 37a2 encircles the inner peripheral edge portion of the resin frame member 36.

Figure 5:
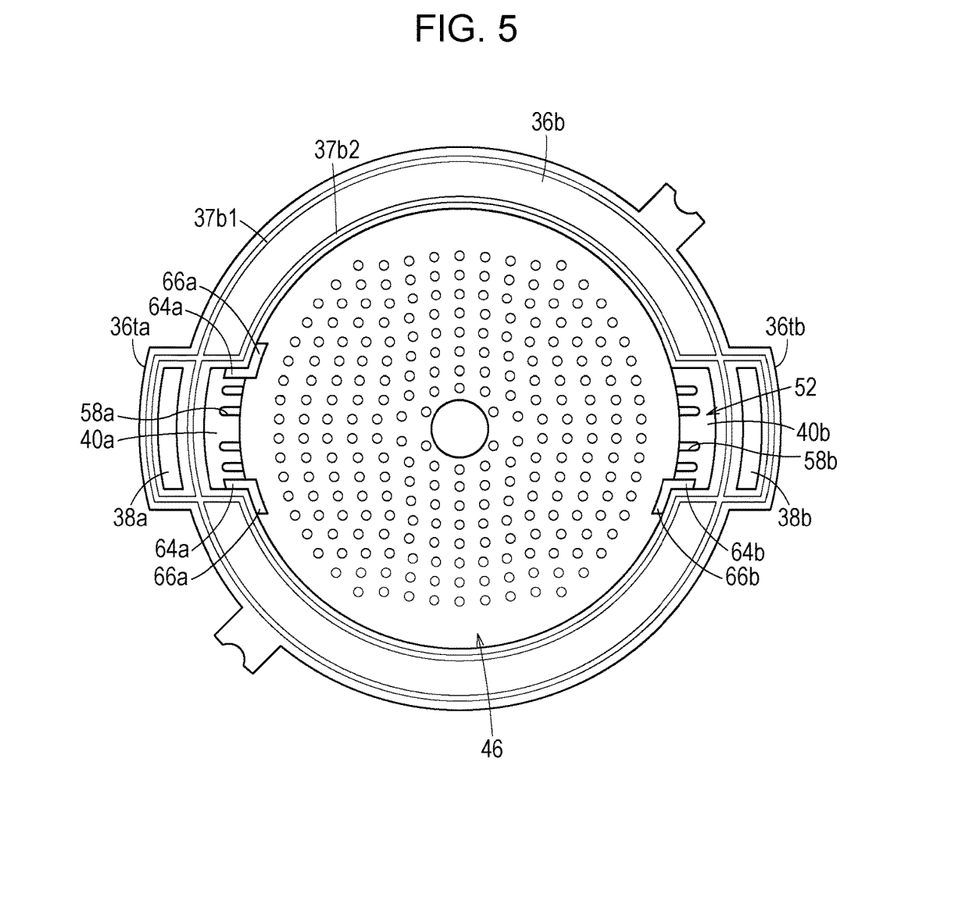
FIG. 5 is a plan view of the resin frame member and a water plate member viewed from the upper side.

As illustrated in FIGS. 2, 3, and 5, second sealing members 37b1 and 37b2 are provided on a surface 36b oriented towards the cathode separator 34 of the resin frame member 36. While the second sealing member 37b1 encircles an outer peripheral edge portion of the resin frame member 36, the second sealing member 37b2 encircles the inner peripheral edge portion of the resin frame member 36.

When the differential pressure water electrolysis system 10 is in operation, a sum of a load on the first sealing member 37a1 and a load on the first sealing member 37a2 is the same as a sum of a load on the second sealing member 37b1 and a load on the second sealing member 37b2. In other words, the load imposed on the first sealing members 37a1 and 37a2 is the same as the load imposed on the second sealing members 37b1 and 37b2 in the stacking direction.

Bulging portions 36ta and 36tb are formed at both ends of the resin frame member 36 in a diametric direction so as to bulge outwards in the diametric direction. Water inlet manifolds 38a that are in communication with each other in the stacking direction (the arrow A direction) for supplying water (pure water) are provided at the bulging portions 36ta of the resin frame members 36 in a diametric direction. Water outlet manifolds 38b for discharging oxygen that has been generated by reaction and unreacted water (a fluid mixture) are provided at the bulging portions 36tb of the resin frame members 36.

As illustrated in FIGS. 3 and 4, water supply ports 40a that are in communication with the water inlet manifolds 38a through cut-out portions 39a and that introduce water are formed in the vicinities of the bulging portions 36ta of the resin frame members 36. Water discharge ports 40b that discharge water (surplus water) after electrolysis and that are in communication with the water outlet manifolds 38b through cut-out portions 39b are formed in the vicinities of the bulging portions 36tb of the resin frame members 36.

As illustrated in FIG. 1, a water supply pipe 42a that is in communication with the water inlet manifolds 38a is connected to the side portion of the lowest resin frame member 36 in the stacking direction. A water discharge pipe 42b that is in communication with the water outlet manifolds 38b is connected to the side portion of the highest resin frame member 36 in the stacking direction.

High pressure hydrogen manifolds 38c that are in communication with each other and that penetrate the substantially center of the electrolysis area are provided in the center portions of the high-pressure water electrolysis cells 12 (see FIGS. 2 and 3).

The high pressure hydrogen manifolds 38c discharge high pressure hydrogen that has been generated by reaction (hydrogen that is higher in pressure then the pressure of the generated oxygen, 1 MPa to 80 MPa, for example).

Each anode separator 32 and each cathode separator 34 have a substantially disc shape and are configured of, for example, a carbon member. Other than the carbon member, each anode separator 32 and each cathode separator 34 may be formed by pressing a steel plate, a stainless steel plate, a titanium plate, an aluminum plate, a plated steel plate, or a metal plate on which anticorrosive surface treatment has been applied to its metal surface.

Alternatively, anticorrosive surface treatment may be applied after machining has been performed.

Each electrolyte membrane-electrode structure 30 is provided with a solid polymer electrolyte membrane (an electrolyte membrane) 44 that has a substantially ring shape. Each solid polymer electrolyte membrane 44 is held between an anode current collector 46 and a cathode current collector 48 for electrolysis having a ring shape. Each solid polymer electrolyte membrane 44 is configured of a hydrocarbon (HC)-based membrane or a fluorine-based membrane, for example.

Each high pressure hydrogen manifold 38c is formed in a substantially center portion of the corresponding solid polymer electrolyte membrane 44. An anode electrode catalyst layer 46a that has a ring shape is provided on one surface of the solid polymer electrolyte membrane 44. A cathode electrode catalyst layer 48a that has a ring shape is formed on the other surface of the solid polymer electrolyte membrane 44. Each anode electrode catalyst layer 46a employs a ruthenium (Ru)-based catalyst, for example, and each cathode electrode catalyst layer 48a employs a platinum catalyst, for example.

Each anode current collector 46 and each cathode current collector 48 are configured of a spherical gas atomizing titanium powder sintered compact (porous conductor), for example. Each anode current collector 46 and each cathode current collector 48 are provided with a smooth surface portion on which etching process has been performed after grinding. The porosities of each anode current collector 46 and each cathode current collector 48 are set within the range of 10% to 50%, more preferably, 20% to 40%. A frame portion 46e is fitted to the outer peripheral edge portion of each anode current collector 46. The frame portions 46e are finer than the anode current collectors 46. Note that by having the outer peripheral portion of each anode current collector 46 be formed in a fine manner, the outer peripheral portion may serve as the frame portion 46e.

Each anode separator 32 includes (or defines) an anode chamber 50an in which the anode current collector 46 is accommodated, and each cathode separator 34 includes (or defines) a cathode chamber 50ca in which the cathode current collector 48 is accommodated.

Figure 6:
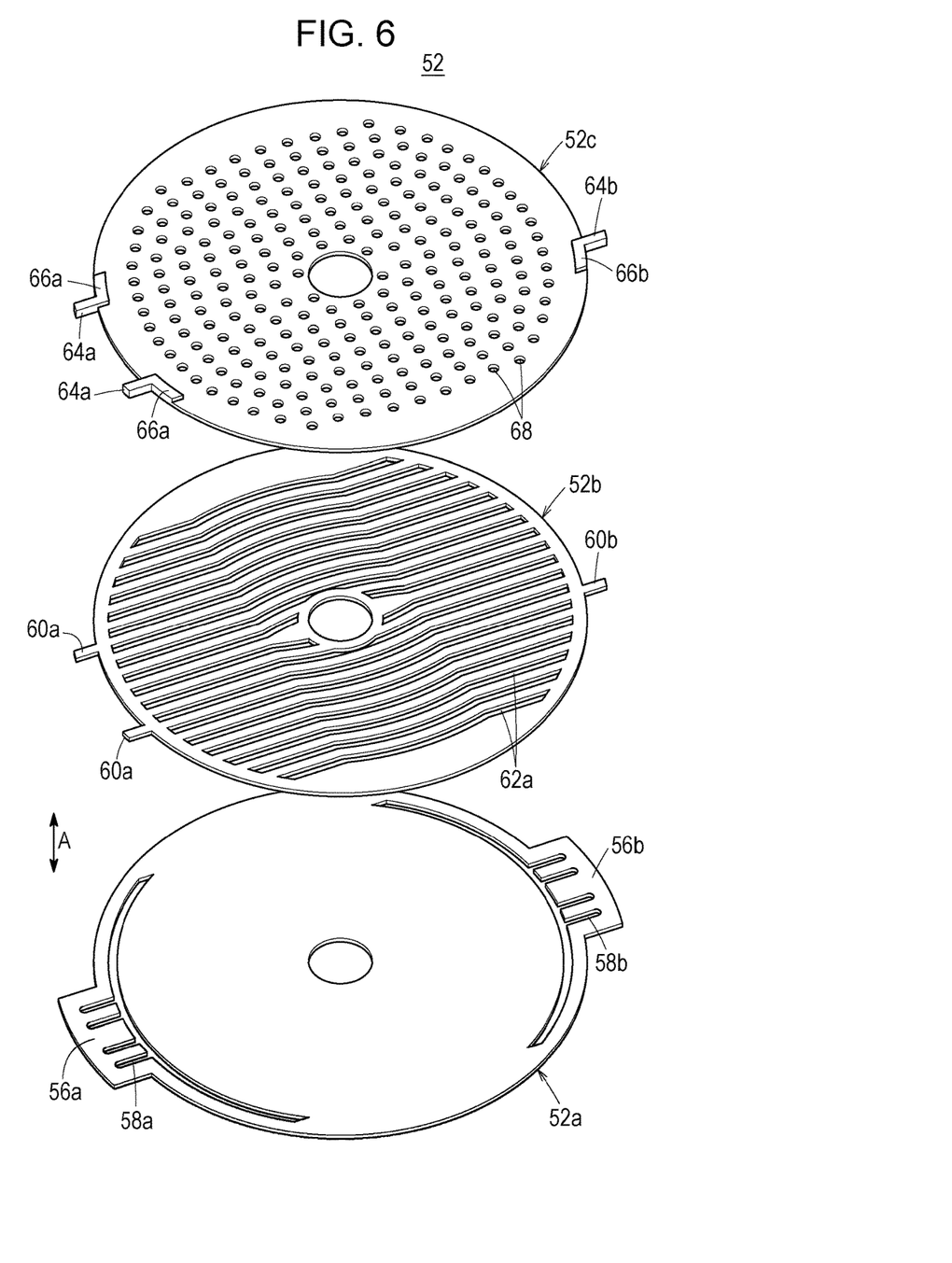
FIG. 6 is an exploded perspective view for describing the water plate member.

A tabular water plate member 52 is interposed between each anode separator 32 and the corresponding anode current collector 46 (the anode chamber 50an), and a protection sheet member 54 is interposed between each anode current collector 46 and the corresponding anode electrode catalyst layer 46a. Each water plate member 52 has a substantially disk-shape (see FIG. 2). As illustrated in FIG. 6, the water plate member 52 is configured by a plurality of, for example, three doughnut-shaped plates, namely, a first plate 52a, a second plate 52b, and a third plate 52c stacked on each other.

The first plate 52a has a disk shape including projections 56a and 56b at both ends in the diametric direction. A supply connection passage 58a that is in communication with a corresponding water supply port 40a is formed in each projection 56a. In each supply connection passage 58a, a plurality of branch portions are integrally connected to an arcuate flow passage portion. A discharge connection passage 58b that is in communication with a corresponding water discharge port 40b is formed in each projection 56b. In each discharge connection passage 58b, a plurality of branch portions are integrally connected to an arcuate flow passage portion.

An outer peripheral portion of each second plate 52b is provided with a pair of (or a single) protrusions 60a that protrude towards the corresponding water supply port 40a and a single (or a pair of) protrusion 60b that protrudes towards the corresponding water discharge port 40b. In each second plate 52b, a plurality of flow passage grooves (water flow passages) 62a, both ends of which are in communication with the corresponding arcuate flow passage portions of the supply connection passage 58a and the discharge connection passage 58b, are formed so as to extend in a substantially parallel manner with respect to each other.

An outer peripheral portion of each third plate 52c is provided with a pair of (or a single) protrusions 64a that protrude towards the corresponding water supply port 40a and a single (or a pair of) protrusion 64b that protrudes towards the corresponding water discharge port 40b. The protrusions 64a and 64b include projecting portions 66a and 66b that bulge in a water plate thickness direction (the arrow A direction).

As illustrated in FIGS. 2 and 5, the interval between the pair of protrusions 64a is the same as a width dimension between the inner walls forming the water supply port 40a, and the rotation of the water plate member 52 is stopped by the portion between the inner walls. The protrusion 64b abuts against one of the inner wall surfaces that forms the water discharge ports 40b.

Figure 7:
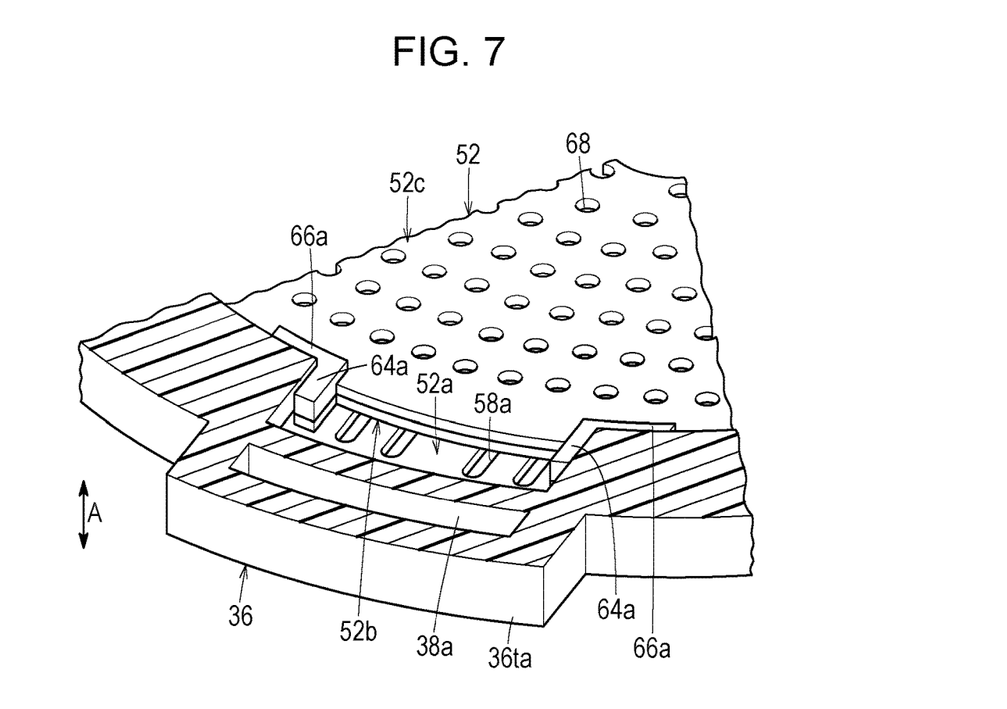
FIG. 7 is a perspective view for describing a portion of the resin frame member and the water plate member.

As illustrated in FIG. 3, an interval t1 from an inner surface of the anode separator 32 to a bottom surface of the resin frame member 36 is set smaller than an interval t2 from the inner surface of the anode separator 32 to the upper surfaces of the protrusion 64a and 64b. The protrusions 64a and 64b abut against the end portions of the resin frame member 36; accordingly, the water plate member 52 does not move in the lower portion of the resin frame member 36 (see FIG. 7).

A plurality of hole portions 68 that are in communication with the flow passage grooves 62a are formed in the surface of the third plate 52c. The hole portions 68 open towards the anode current collector 46.

An inner peripheral position of each protection sheet member 54 is disposed on the inner side with respect to the inner peripheral positions of the corresponding anode current collector 46 and cathode current collector 48, and an outer peripheral position of each protection sheet member 54 is set at the same position as the outer peripheral positions of the corresponding solid polymer electrolyte membrane 44, anode current collector 46, and water plate member 52. The protection sheet member 54 includes a plurality of through holes 54a that are provided in an area (the electrolysis area) opposing the anode electrode catalyst layer 46a in the stacking direction. The protection sheet member 54 includes a frame portion 54b on the outside of the electrolysis area. A rectangular hole portion (not shown) is formed in the frame portion 54b.

Manifold members 70 that each surround the corresponding high pressure hydrogen manifold 38c are each disposed between the corresponding anode separator 32 and solid polymer electrolyte membrane 44. Each manifold member 70 has a substantially columnar shape and seal chambers 70a and 70b are provided at the two ends of the manifold member 70 in the axial direction by cutting out ring shapes in the manifold member 70. O-rings 72a and 72b that encircle the high pressure hydrogen manifolds 38c are disposed in each of the seal chambers 70a and 70b. Groove portions 70s in which the protection sheet members 54 are disposed are formed in the end faces of the manifold members 70 that oppose the solid polymer electrolyte membrane 44.

As illustrated in FIGS. 2 and 3, the cathode current collectors 48 and load application mechanisms 74 that press the cathode current collectors 48 against the solid polymer electrolyte membranes 44 are disposed in the cathode chambers 50ca. The load application mechanisms 74 each include an elastic member, for example, a plate spring 76. The plate springs 76 apply load to the cathode current collectors 48 through metal plate spring holders (shim members) 78. Note that other than the plate springs 76, for example, disk springs or coil springs may be used as the elastic members.

Conductive sheets 80 are disposed between the cathode current collectors 48 and the plate spring holders 78. The conductive sheets 80 are each configured of a metal sheet made of titanium, SUS, iron, or the like, and each have a ring shape. The conductive sheets 80 are configured so as to have a diameter that is substantially the same as that of the cathode current collectors 48.

An insulation member, for example, a resin sheet 82, is disposed at the center portion of each cathode current collector 48 and between the corresponding conductive sheet 80 and solid polymer electrolyte membrane 44. The resin sheets 82 fit into the inner peripheral surfaces of the cathode current collectors 48. The resin sheets 82 are set with thicknesses that are substantially the same as those of the cathode current collectors 48. For example, PEN (polyethylenenaphthalate) or polyimide films are used as the resin sheets 82.

Manifold members 84 are disposed between the resin sheets 82 and cathode separators 34. The manifold members 84 each have a cylindrical shape, and the high pressure hydrogen manifolds 38c are formed at the center portion of the manifold members 84. Hydrogen discharge passages 85 that communicate the cathode chambers 50ca and the high pressure hydrogen manifolds 38c to each other are formed at one ends of the manifold members 84 in the axial direction.

Sealing members (O-rings) 86 that encircle the outer peripherals of the cathode current collectors 48, the plate spring holders 78, and the conductive sheets 80 are disposed in the cathode chambers 50ca. Pressure resistant members 88 are disposed at the outer peripherals of the sealing members 86. The pressure resistant members 88 each have a substantially ring shape, and the outer peripheral portions thereof fit into the inner peripheral portions of the resin frame members 36.

An operation of the differential pressure water electrolysis system 10 configured in the above manner will be described below.

As illustrated in FIG. 1, water is supplied to the water inlet manifolds 38a of the differential pressure water electrolysis system 10 from the water supply pipe 42a, and voltage is applied to the terminals 24a and 24b of the terminal plates 16a and 16b through the electrolysis power source 28. Accordingly, as illustrated in FIG. 3, in each high-pressure water electrolysis cell 12, water is supplied to the plurality of flow passage grooves 62a of the water plate member 52 from the water inlet manifold 38a through the water supply port 40a. The water is supplied to the anode current collector 46 through the plurality of hole portions 68 and moves into the anode current collector 46.

Accordingly, the water is decomposed in the anode electrode catalyst layer 46a by electricity and hydrogen ions, electrons, and oxygen are generated. The hydrogen ions that have been generated by anodic reaction permeate the solid polymer electrolyte membrane 44, are transferred to the cathode electrode catalyst layer 48a side, and are combined with the electrons such that hydrogen is obtained.

Accordingly, hydrogen flows along the hydrogen flow passage inside the cathode current collector 48 and is discharged to the high pressure hydrogen manifold 38c through the hydrogen discharge passage 85. The hydrogen being maintained at a pressure that is higher than the pressure inside the water inlet manifold 38a flows through the high pressure hydrogen manifold 38c so as to be capable of being ejected to the outside of the differential pressure water electrolysis system 10. Meanwhile, oxygen generated by the reaction and unreacted water are discharged to the water outlet manifolds 38b from the water discharge ports 40b and is discharged to the outside of the differential pressure water electrolysis system 10 through the water discharge pipe 42b.

In such a case, in the present exemplary embodiment, by using the tabular anode separators 32 and the tabular cathode separators 34, operation of processing the separators is simplified and the manufacturing cost of the high-pressure water electrolysis cells 12 can be reduced easily.

Furthermore, the resin frame members 36 are disposed in portions that are not exposed to high-pressure atmospheres, in other words, in normal-pressure portions that are separated from the high-pressure atmospheres with the sealing members 86 and the pressure resistant members 88. Accordingly, material cost is desirably reduced and reduction of cost of the high-pressure water electrolysis cells 12 can be achieved easily.

With the above, with a simple configuration, the high-pressure portions can be reliably sealed and pressure resistant materials can be reduced to the extent possible. Accordingly, an effect is obtained in that the entire differential pressure water electrolysis system 10 can be manufactured economically.

Furthermore, in the present exemplary embodiment, the tabular water plate members 52 are disposed in the inner peripheral surfaces of the resin frame members 36. In each water plate member 52, the flow passage grooves 62a that distributes water and that is in communication with the corresponding water supply port 40a and the corresponding water discharge ports 40b, and the plurality of hole portions 68 that are in communication with the flow passage grooves 62a and that supply the water to the anode current collector 46 are formed. Accordingly, since each water plate member 52 is configured to have a tabular shape, the operation of processing the water plate members 52 is effectively simplified.

Furthermore, in each water plate member 52, the protrusions 64a and 64b that protrude outwards with respect to the surface of the water plate and towards the corresponding water supply port 40a and the corresponding water discharge port 40b are formed. Moreover, the projecting portions 66a and 66b that bulge out in the water plate thickness direction is provided in the protrusion 64a and 64b. In the above, the interval between the pair of protrusion 64a is the same as the width dimension between the inner walls forming the water supply port 40a, and the protrusion 64b abuts against one of the inner wall surfaces forming the water discharge ports 40b. With the above, as illustrated in FIGS. 2 and 5, the rotation of the water plate member 52 is stopped with respect to the resin frame member 36.

Furthermore, as illustrated in FIG. 3, the interval t1 from the inner surface of the anode separator 32 to the bottom surface of the resin frame member 36 is set smaller than the interval t2 from the inner surface of the anode separator 32 to the upper surfaces of the protrusion 64a and 64b. Accordingly, the protrusions 64a and 64b abut against the end portions of the resin frame member 36 and, thus, the water plate member 52 does not move in the lower portion of the resin frame member 36 (see FIG. 7). Accordingly, water leakage can be prevented from occurring to the extent possible.

Furthermore, as illustrated in FIGS. 3 and 4, the first sealing members 37a1 and 37a2 are provided on the surface 36a oriented towards the anode separator 32 of the resin frame member 36. Meanwhile, as illustrated in FIGS. 2, 3, and 5, the second sealing members 37b1 and 37b2 are provided on the surface 36b oriented towards the cathode separator 34 of the resin frame member 36.

In the above, the load imposed on the first sealing members 37a1 and 37a2 is the same as the load imposed on the second sealing members 37b1 and 37b2. With the above, even if a high pressure is applied, the resin frame member 36 can be reliably prevented from being bent.

A differential pressure water electrolysis system according to the present disclosure includes a plurality of high-pressure water electrolysis cells. Each high-pressure water electrolysis cell includes an electrolyte membrane, an anode current collector and a cathode current collector that hold the electrolyte in between, and a tabular anode separator and a tabular cathode separator. Each tabular anode separator includes an anode chamber in which the anode current collector is accommodated, and each tabular cathode separator includes a cathode chamber in which the cathode current collector is accommodated. A sealing member is disposed in the cathode chamber so as to encircle the cathode current collector.

The differential pressure water electrolysis system includes a high-pressure water electrolysis cell that electrolyzes water that has been supplied, that generates oxygen on an anode current collector side, and that generates hydrogen, on a cathode current collector side, that has a pressure that is higher than a pressure of the oxygen. Furthermore, a plurality of the high-pressure water electrolysis cells are stacked, and a high pressure hydrogen manifold that distributes the hydrogen, having a high pressure, in the stacking direction of the high-pressure water electrolysis cell is provided so as be encircled by the sealing member.

A resin frame member is disposed between the tabular anode separator and the tabular cathode separator so as to surround the sealing member and the anode current collector. A water supply port that introduces water for electrolysis and a water discharge port that discharges a surplus of the water after electrolysis are formed in the resin frame member.

Furthermore, desirably, a tabular water plate is disposed in an inner peripheral surface of the resin frame member. In the above, desirably, the tabular water plate includes a water flow passage that is in communication with the water supply port and the water discharge port and that distributes the water along an inside of the tabular water plate, and a plurality of hole portions that are in communication with the water flow passage and that supply the water to the anode current collector.

Furthermore, desirably, the tabular water plate includes protrusions that protrude outwards with respect to a surface of the water plate and towards either of the water supply port and the water discharge port are formed in the tabular water plate, and projecting portions that bulge in a water plate thickness direction.

Furthermore, desirably, a first sealing member is provided between the resin frame member and the tabular anode separator, and a second sealing member is provided between the resin frame member and the tabular cathode separator. In the above, desirably, the first sealing member and the second sealing member are disposed such that a load on the first sealing member and a load on the second sealing member are the same.

According to the present disclosure, by using the tabular anode separator and the tabular cathode separator, operation of processing the separator is simplified and the manufacturing cost of the high-pressure water electrolysis cell can be reduced easily. Moreover, the resin frame member is disposed in a portion that is not exposed to a high-pressure atmosphere. Accordingly, material cost is desirably reduced and cost reduction can be achieved easily.

With the above, with a simple configuration, the high-pressure portions can be reliably sealed and pressure resistant materials can be reduced to the extent possible. Accordingly, the entire differential pressure water electrolysis system can be manufactured economically.

Obviously, numerous modifications and variations of the present invention are possible in light of the above teachings. It is therefore to be understood that within the scope of the appended claims, the invention may be practiced otherwise than as specifically described herein.

What is claimed is:

1. A differential pressure water electrolysis system comprising:
high-pressure water electrolysis cells stacked in a stacking direction, each of the high-pressure water electrolysis cells comprising:
an electrolyte membrane;
an anode current collector and a cathode current collector that hold the electrolyte membrane between the anode current collector and the cathode current collector;
a tabular anode separator defining an anode chamber in which the anode current collector is accommodated;
a tabular cathode separator defining a cathode chamber in which the cathode current collector is accommodated;
a sealing member disposed in the cathode chamber so as to encircle the cathode current collector; and
a resin frame member disposed between the tabular anode separator and the tabular cathode separator so as to surround the sealing member and the anode current collector, the resin frame member comprising:
a water supply port to introduce water for electrolysis; and
a water discharge port to discharge a surplus of the water after electrolysis;
each of the high-pressure water electrolysis cells being to electrolyze the water that has been supplied to each of the high-pressure water electrolysis cells to generate oxygen on an anode current collector side and generate hydrogen having a pressure higher than a pressure of the oxygen on a cathode current collector side; and
a high pressure hydrogen manifold provided so as to distribute the hydrogen in the stacking direction and so as to be encircled by the sealing member,
wherein each of the high-pressure water electrolysis cells includes:
a first sealing member provided between the resin frame member and the tabular anode separator; and
a second sealing member provided between the resin frame member and the tabular cathode separator,
wherein the first sealing member and the second sealing member are disposed such that a load on the first sealing member and a load on the second sealing member are the same,
wherein the first sealing member comprises a first inner sealing member which encircles a first inner peripheral edge portion of the resin frame member and a first outer sealing member which encircles a first outer peripheral edge portion of the resin frame member, and
wherein the second sealing member comprises a second inner sealing member which encircles a second inner peripheral edge portion of the resin frame member and a second outer sealing member which encircles a second outer peripheral edge portion of the resin frame member.

2. The differential pressure water electrolysis system according to claim 1,
wherein each of the high-pressure water electrolysis cells includes a tabular water plate disposed inside an inner peripheral surface of the resin frame member, and
wherein the tabular water plate includes
a water flow passage that is in communication with the water supply port and the water discharge port and that distributes the water along an inside of the tabular water plate, and
hole portions that are in communication with the water flow passage and that supply the water to the anode current collector.

3. The differential pressure water electrolysis system according to claim 2,
wherein the tabular water plate includes
protrusions that protrude outwards with respect to a surface of the tabular water plate and towards either of the water supply port and the water discharge port are provided in the tabular water plate, and
projecting portions that bulge in a thickness direction of the tabular water plate are provided in the protrusions.

4. The differential pressure water electrolysis system according to claim 1,
wherein the first inner sealing member, the first outer sealing member, the second inner sealing member, and the second outer sealing member are disposed such that a sum of a load on the first inner sealing member and a load on the first outer sealing member is equal to a sum of a load on the second inner sealing member and a load on the second outer sealing member.

5. The differential pressure water electrolysis system according to claim 1,
wherein the high pressure hydrogen manifold is provided in center portions of the high-pressure water electrolysis cells and extends through the high-pressure water electrolysis cells in the stacking direction.

6. The differential pressure water electrolysis system according to claim 5,
wherein the resin frame member includes a first bulging portion bulging outward with respect to the high pressure hydrogen manifold and having a water inlet manifold through which the water is supplied,
wherein the water inlet manifold is in communication with the water supply port,
wherein the resin frame member includes a second bulging portion bulging outward with respect to the high pressure hydrogen manifold and having a water outlet manifold through which the oxygen and unreacted water are discharged, and
wherein the water outlet manifold is in communication with the water discharge port.

7. A differential pressure water electrolysis system comprising:
high-pressure water electrolysis cells stacked in a stacking direction, each of the high-pressure water electrolysis cells comprising:
an electrolyte membrane;
an anode current collector and a cathode current collector that hold the electrolyte membrane between the anode current collector and the cathode current collector;
a tabular anode separator defining an anode chamber in which the anode current collector is accommodated;
a tabular cathode separator defining a cathode chamber in which the cathode current collector is accommodated;
a sealing member disposed in the cathode chamber so as to encircle the cathode current collector; and
a resin frame member disposed between the tabular anode separator and the tabular cathode separator so as to surround the sealing member and the anode current collector, the resin frame member comprising:
a water supply port to introduce water for electrolysis; and
a water discharge port to discharge a surplus of the water after electrolysis;
each of the high-pressure water electrolysis cells being to electrolyze the water that has been supplied to each of the high-pressure water electrolysis cells to generate oxygen on an anode current collector side and generate hydrogen having a pressure higher than a pressure of the oxygen on a cathode current collector side; and
a high pressure hydrogen manifold provided so as to distribute the hydrogen in the stacking direction and so as to be encircled by the sealing member,
wherein each of the high-pressure water electrolysis cells includes a tabular water plate disposed inside an inner peripheral surface of the resin frame member,
wherein the tabular water plate includes:
a water flow passage that is in communication with the water supply port and the water discharge port and that distributes the water along an inside of the tabular water plate; and
hole portions that are in communication with the water flow passage and that supply the water to the anode current collector,
wherein the tabular water plate includes:
protrusions that protrude outwards with respect to a surface of the tabular water plate and towards either of the water supply port and the water discharge port are provided in the tabular water plate; and
projecting portions that bulge in a thickness direction of the tabular water plate are provided in the protrusions, and wherein an interval from an inner surface of the tabular anode separator to a bottom surface of the resin frame member is set smaller than an interval from the inner surface of the tabular anode separator to upper surfaces of the protrusions of the tabular water plate.

8. The differential pressure water electrolysis system according to claim 7,
wherein each of the high-pressure water electrolysis cells includes
a first sealing member provided between the resin frame member and the tabular anode separator, and
a second sealing member provided between the resin frame member and the tabular cathode separator, and
wherein the first sealing member and the second sealing member are disposed such that a load on the first sealing member and a load on the second sealing member are the same.

9. The differential pressure water electrolysis system according to claim 3,
wherein the protrusions of the tabular water plate abut against end portions of the resin frame member.

10. The differential pressure water electrolysis system according to claim 2,
wherein the water flow passage of the tabular water plate comprises flow passage grooves, and
wherein the flow passage grooves extend between the water supply port and the water discharge port in a substantially parallel with respect to each other.

11. A differential pressure water electrolysis system comprising:
high-pressure water electrolysis cells stacked in a stacking direction, each of the high-pressure water electrolysis cells comprising:
an electrolyte membrane;
an anode current collector and a cathode current collector that hold the electrolyte membrane between the anode current collector and the cathode current collector;
a tabular anode separator defining an anode chamber in which the anode current collector is accommodated;
a tabular cathode separator defining a cathode chamber in which the cathode current collector is accommodated;
a sealing member disposed in the cathode chamber so as to encircle the cathode current collector; and
a resin frame member disposed between the tabular anode separator and the tabular cathode separator so as to surround the sealing member and the anode current collector, the resin frame member comprising:
a water supply port to introduce water for electrolysis; and
a water discharge port to discharge a surplus of the water after electrolysis;
each of the high-pressure water electrolysis cells being to electrolyze the water that has been supplied to each of the high-pressure water electrolysis cells to generate oxygen on an anode current collector side and generate hydrogen having a pressure higher than a pressure of the oxygen on a cathode current collector side; and
a high pressure hydrogen manifold provided so as to distribute the hydrogen in the stacking direction and so as to be encircled by the sealing member,
wherein each of the high-pressure water electrolysis cells includes a tabular water plate disposed inside an inner peripheral surface of the resin frame member,
wherein the tabular water plate includes:
a water flow passage that is in communication with the water supply port and the water discharge port and that distributes the water along an inside of the tabular water plate; and
hole portions that are in communication with the water flow passage and that supply the water to the anode current collector,
wherein the tabular water plate includes:
protrusions that protrude outwards with respect to a surface of the tabular water plate and towards either of the water supply port and the water discharge port are provided in the tabular water plate; and
projecting portions that bulge in a thickness direction of the tabular water plate are provided in the protrusions,
wherein the protrusions of the tabular water plate include a pair of protrusions which protrude towards the water supply port of the resin frame member, and
wherein an interval between the pair of protrusions is equal to a width between inner walls of the resin frame member forming the water supply port.

12. The differential pressure water electrolysis system according to claim 1,
wherein each of the high-pressure water electrolysis cells includes a manifold member disposed between the tabular anode separator and the electrolyte membrane in the stacking direction, and
wherein the manifold member surrounds the high pressure hydrogen manifold and includes a seal chamber in which a sealing member is disposed to encircle the high pressure hydrogen manifold.

13. The differential pressure water electrolysis system according to claim 1,
wherein each of the high-pressure water electrolysis cells includes a pressure resistant member disposed between the tabular cathode separator and the electrolyte membrane in the stacking direction at an outer peripheral of the sealing member, and
wherein an outer peripheral portion of the pressure resistant member is fit into an inner peripheral portion of the resin frame member.

* * * * *